Patented June 28, 1938

2,121,899

UNITED STATES PATENT OFFICE

2,121,899

TREATMENT OF CELLULOSE TRIACETATE

Harold Allden Auden, Banstead, Hanns Peter Staudinger, Epsom, and Philip Eaglesfield, Carshalton, England, assignors to Ernst Berl, Pittsburgh, Pa.

No Drawing. Application January 30, 1935, Serial No. 4,206. In Great Britain February 16, 1934

1 Claim. (Cl. 260—102)

This invention relates to the treatment of cellulose triacetate, and has for its chief object a treatment that renders it soluble in acetone and furthermore one that can be regulated in stages between insolubility of the ester in acetone and complete solubility in acetone.

With the above object in view the present invention consists essentially in treating the cellulose triacetate at a raised temperature with a substantial quantity of an alcohol having a swelling or a solvent action on the triacetate in the presence of small amounts of an esterifying catalyst such for example as phosphoric acid, sulphuric acid, or the like.

Suitable alcohols for the purpose are simple aliphatic alcohols such as ethyl, propyl, isobutyl and amyl alcohol, and ethylene glycol; or simple aromatic alcohols such as benzyl alcohol and cyclo-hexanol; or mixtures of the foregoing alcohols.

An advantageous method of working consists in or comprises the use of alcohols having a swelling but no solvent effect whereby the partially de-esterified cellulose acetate remains undissolved in the reacting medium and can be separated out by simple mechanical means. The unreacted alcohol and the ester resulting from the released acetic acid and the alcohol can be separated by the usual means, e. g. by fractional distillation, and the alcohol together with the undistilled catalyst returned to the process. Suitable alcohols for this method of procedure are ethyl, propyl, isobutyl and amyl alcohols and ethylene glycol.

As an alternative to the use of alcohols having a swelling but no solvent effect, an alcohol having a definite solvent action on the cellulose triacetate can be employed, for example, cyclo-hexanol or benzyl alcohol. In this case the partially de-esterified cellulose acetate is recovered by precipitation by means of a non-aqueous medium miscible with the alcohol employed and with the ester resulting from the released acetic acid and the alcohol. Suitable precipitating media are, for example, methyl alcohol, or benzene.

One important advantage of the present invention is that the products, at different stages of the treatment of the cellulose triacetate present valuable differences and that the action can be regulated to give any one of these products. The following are three important stages:—

(a) A stage at which the cellulose triacetate has an increased viscosity in methylene chloride or in a mixture of methylene chloride and alcohol but is still soluble therein and still insoluble or only partly soluble in acetone. At this stage the acetyl content is probably not lowered below the "triacetate" value.

(b) A stage at which the cellulose acetate is soluble in acetone but on casting a film from the solution and drying it, the dry film is no longer soluble in acetone.

(c) A stage at which the cellulose acetate is completely soluble in acetone.

In determining which product is desired the four main factors that seem to be involved are the time of treatment, the temperature, the nature of the alcohol, and the activity of the catalyst. The higher the temperature the shorter the time required in attaining the respective stages. However, the maximum temperature is limited by the boiling point of the alcohol used, and the lower the boiling point of the alcohol used the greater should be the activity of the catalyst employed; the nature of the alcohol used does not otherwise have a very marked effect upon the degree of conversion. The greater the activity of the catalyst the shorter the time required to attain the respective stages and/or the greater the extent of de-esterification. Where only the first or second stage is desired a catalyst of mild activity such as phosphoric acid is preferable so that the time occupied will not be unduly short.

The various ways in which the invention can be carried into effect will be evident from the following examples:—

Example 1

10 parts of cellulose triacetate were treated for 2½ hours at 100° C. with
150 parts of normal butyl alcohol and
15 parts of orthophosphoric acid ($H_3PO_4$) of 80 per cent strength.

After separation of the triacetate, it was found to be substantially unchanged in acetyl value and to be still substantially insoluble in acetone, but its viscosity in methylene chloride was found to have been increased by about 20 per cent. Such increased viscosity is of technical advantage in certain applications.

Example 2

10 parts of cellulose triacetate were treated for 2½ hours at 76° C. with
100 parts of ethyl alcohol and
3 parts of nitric acid of 67 per cent strength.

After separation of the acetate, it was found to be partially de-esterified and to be soluble in acetone, but that on casting a film from a solution thereof (in acetone) and drying the film, the dried film was no longer soluble in acetone.

Example 3

10 parts of cellulose triacetate were treated for 10 hours at 93° C. with
100 parts of propyl alcohol and
8 parts of orthophosphoric acid ($H_3PO_4$) of 80 per cent strength.

After separation of the acetate it was found to have substantially the properties specified in the case of Example 2.

Example 4

10 parts of cellulose triacetate were treated for 2½ hours at 127° C. with
100 parts of iso-amyl alcohol, and
8 parts of orthophosphoric acid ($H_3PO_4$) of 80 per cent strength.

After separation of the acetate it was found to have substantially the properties specified in the case of Example 2.

Example 5

10 parts of cellulose triacetate were treated for 14 hours at 37° C. with
100 parts of benzyl alcohol and
1 part of concentrated sulphuric acid.

After separation of the acetate it was found to have substantially the properties specified in the case of Example 2.

Example 6

10 parts of cellulose triacetate were treated for 2 hours at 94° C. with
100 parts of normal butyl alcohol and
3 parts of hydrochloric acid of 33 per cent strength.

After separation of the acetate it was found to be completely soluble in acetone.

Example 7

10 parts of cellulose triacetate were treated for 45 hours at 40° C. with
100 parts of normal butyl alcohol and
2 parts of perchloric acid ($HClO_4$) of 20 per cent strength.

After separation of the acetate it was found to be completely soluble in acetone.

Example 8

10 parts of cellulose triacetate were treated for 3 hours at 90° C. with
66 parts of normal butyl alcohol
34 parts of benzyl alcohol and
2 parts of nitric acid of 67 per cent strength.

After separation of the acetate it was found to be completely soluble in acetone.

Example 9

10 parts of cellulose triacetate were treated for 5½ hours at 95° C. with
120 parts of ethylene glycol and
10 parts of phosphoric acid of 80 per cent strength.

After separation of the acetate it was found to be completely soluble in acetone. The same result was obtained by allowing the above mixture to stand for 20 hours at 20° C.

What we claim is:—

The method of converting acetone-insoluble cellulose triacetate into acetone-soluble form comprising heating the triacetate with isobutyl alcohol in the presence of a small amount of esterifying catalyst and in the absence of acetic anhydride and glacial acetic acid.

HAROLD ALLDEN AUDEN.
HANNS PETER STAUDINGER.
PHILIP EAGLESFIELD.